United States Patent [19]

Ujihara et al.

[11] 4,424,542
[45] Jan. 3, 1984

[54] MAGNETIC HEAD AND METHOD OF PRODUCING SAME

[75] Inventors: Takashi Ujihara, Kawagoe; Akiyoshi Inoue, Tokorozawa; Youzou Yamada, Tokorozawa; Shinji Yasuda, Tokorozawa; Shuji Takeda, Tokorozawa; Takao Ioroi, Tokorozawa, all of Japan

[73] Assignee: Pioneer Electronic Corporation, Tokyo, Japan

[21] Appl. No.: 264,121

[22] Filed: May 15, 1981

[30] Foreign Application Priority Data

May 19, 1980 [JP] Japan .................. 55-066288

[51] Int. Cl.³ .................. G11B 5/11; G11B 5/12; G11B 5/27
[52] U.S. Cl. .................. 360/121; 360/129; 29/603
[58] Field of Search .............. 360/121, 129, 125, 119, 360/132; 29/603

[56] References Cited

U.S. PATENT DOCUMENTS

| | | | |
|---|---|---|---|
| 3,359,629 | 12/1967 | Smith | 360/121 |
| 3,590,168 | 6/1971 | Gooch | 360/121 |
| 3,751,599 | 8/1973 | Ogawa et al. | 360/121 |
| 3,864,753 | 2/1975 | Becker et al. | 360/121 |
| 3,969,770 | 7/1976 | Cavallari | 360/129 |

FOREIGN PATENT DOCUMENTS 794978 5/1958 United Kingdom ............... 360/129

Primary Examiner—Alfred H. Eddleman
Attorney, Agent, or Firm—Armstrong, Nikaido, Marmelstein & Kubovcik

[57] ABSTRACT

A magnetic head for acoustic instruments. The head is composed of at least two units. Each unit, in turn, is composed of a shielding case half, a core holder, cores, etc. The core holder and/or the cores are easily positioned in the shielding case half at the time of assembly of the unit. The units are joined to each other to form a complete magnetic head.

7 Claims, 7 Drawing Figures

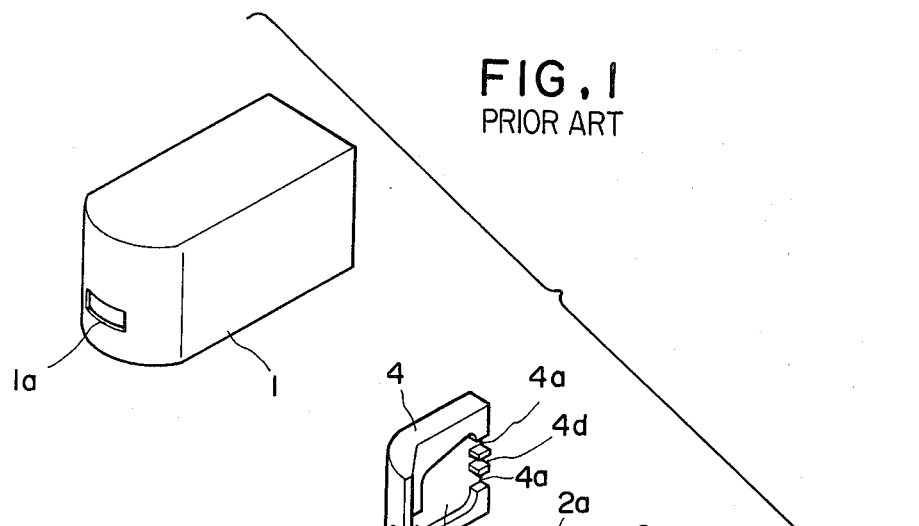
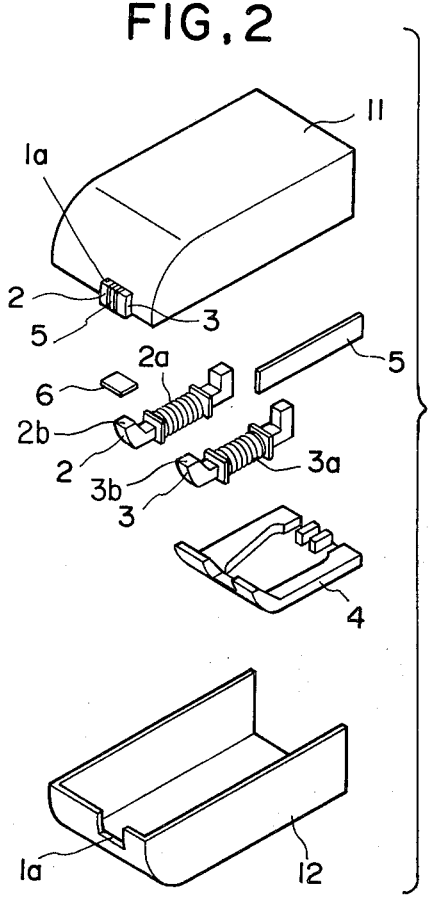
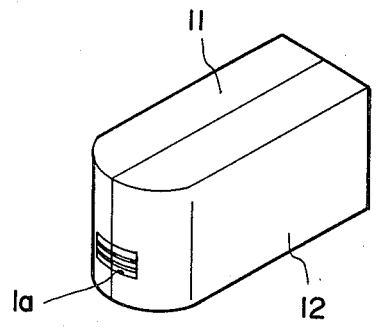

MAGNETIC HEAD AND METHOD OF PRODUCING SAME

BACKGROUND OF THE INVENTION

This invention relates to a recording, reproducing and erasing magnetic head and a method of producing same.

Referring now to FIG. 1, there is shown the structure of a conventional magnetic head, wherein the reference numeral 1 is a shielding case having a core insertion window 1a formed in the front face thereof, 2 and 3 are cores with coils 2a and 3a wound thereon and gap surfaces 2b and 3b and 4 is a core holder, the core holder 4 having grooves 4a and 4b formed therein for positioning the cores 2 and 3 in a predetermined state and further having a recess 4c formed therein for accommodating the coils 2a and 3a, the cores 2, 3 and the core holder 4 being formed symmetrically right and left. Interposed between the cores 2 and 3 is a shielding plate 5 which is used in common to right and left and is positioned by a groove 4d formed in the core holder 4.

Core holders 4 and 4' wherein cores 2, 3 and 2', 3' have been positioned and fixed respectively in the above manner are opposed to each other and joined to form a core unit, and this core unit is inserted and fixed in the shielding case 1 while allowing the end portion of the cores 2 and 3 to extend outside through the window 1a. And the front face of the shielding case 1 is finished by polishing. Numeral 6 designates a spacer.

In such a conventional magnetic head, however, it is very difficult to position the core unit with respect to the shielding case 1, that is, it is difficult to adjust the state of insertion of the core unit with respect to the case 1, thus resulting in decreased working efficiency, increased cost and deteriorated accuracy.

SUMMARY OF THE INVENTION

This invention has been accomplished in view of the above problems. It is the object of the invention to provide a magnetic head and a method of producing same wherein a shielding case is divided into two halves and a core unit is incorporated into each of the shielding case halves whereby the positioning between each case half and the core unit can be made exactly and accurately.

BRIEF DESCRIPTION OF THE DRAWINGS

FIG. 1 is an exploded perspective view of a conventional magnetic head, and FIGS. 2 through 7 show embodiments of this invention wherein:

FIGS. 2 and 3 are respectively an exploded perspective view of a first embodiment and a perspective view after assembly thereof;

FIG. 4 is an exploded perspective view of a second embodiment;

FIG. 5 is an exploded perspective view of a third embodiment; and

FIGS. 6 and 7 are respectively an exploded perspective view of a fourth embodiment and a perspective view after assembly thereof.

DETAILED DESCRIPTION OF THE EMBODIMENTS

Figure 4:
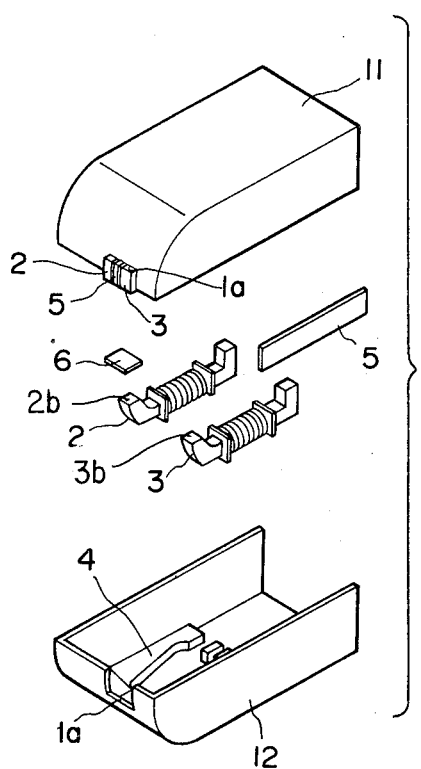

A first embodiment of this invention will be described hereinunder with reference to FIGS. 2 and 3, in which the same reference numerals as those in FIG. 1 indicate the same members so their explanation will be omitted.

In stead of a complete shielding case, a pair of shielding case halves 11 and 12 each having a notched window are formed beforehand as if a complete shielding case were divided along a predetermined gap plane. Like the conventional example shown in FIG. 1, cores 2, 3 and a shielding plate 5 are mounted within a core holder 4, and this core holder 4 is inserted and fixed in each of the shielding case halves 11 and 12 to form two units. In this embodiment, unlike FIG. 1, the shielding plate 5 is cut in half and each fixed to the core holder 4. The junction surfaces of the units each formed as in FIG. 2 are polished to form mirror surfaces, then positioned adjacent each other face to face with a spacer 6 interposed between the window side junction surfaces of the cores 2 and 3, and the shielding case halves 11 and 12 are joined by welding or other means to form a single head. One end portion of each core defines a gap surface, which extends outside of the shielding case half. When the two units are joined to each other, the gap surface of each unit faces that of other unit by way of the spacer 6.

Referring to FIG. 4 which illustrates a second embodiment of this invention, the core holder 4 is formed in advance integrally within each of the shielding case halves 11 and 12 by means of molding, and into the core holder 4 there are inserted and fixed cores 2, 3 and shielding plate 5, which fixation is made using an adhesive or the like to form two units as in the first embodiment. Then, the junction surfaces of the so-formed units are polished to form mirror surfaces and then placed together face to face with the spacer 6 inserted, and the shielding case halves 11 and 12 are joined by arc welding, brazing or laser welding.

Figure 5:
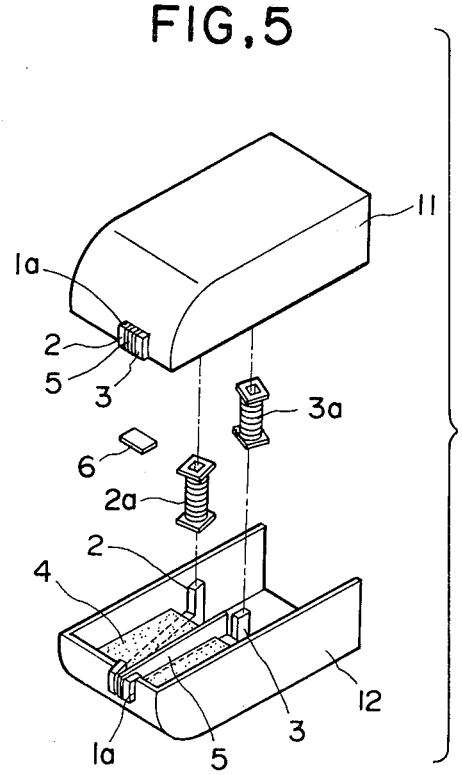

Referring to FIG. 5 in which a third embodiment is illustrated, the cores 2, 3 and the shielding plate 5 are positioned relative to each of the shielding case halves 11 and 12, and in this state a non-magnetic material such as a molten synthetic resin or a molten die-casting zinc is poured over one portion of the cores while another portion remains above the molten material and is allowed to set therein to integrate the components. In this case, if the coils 2a and 3a are mounted in advance as illustrated in FIG. 4, they may be broken because a high temperature molten resin or metal is poured in this embodiment, and therefore the coils 2a and 3a are not mounted yet. Then, the junction surfaces of the so-formed units are polished to form mirror surfaces and the coils 2a and 3a are fitted over junction portions of the cores 2 and 3 which remain above the poured material, and thereafter the shielding case halves 11 and 12 are placed together face to face with the spacer 6 inserted and joined by arc welding, brazing or laser welding.

Figure 6:
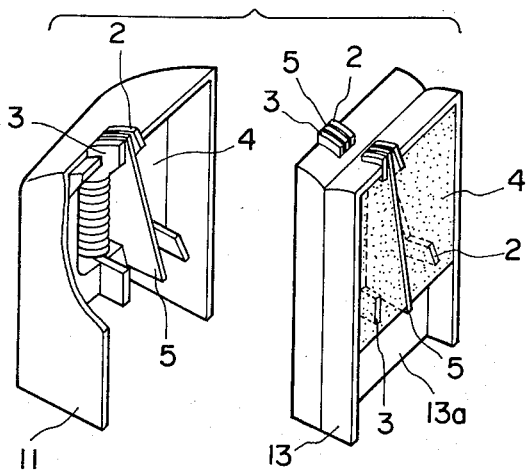
Figure 7:
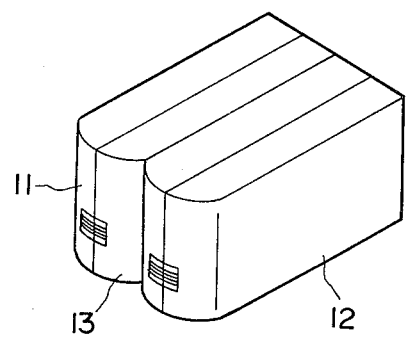

Referring to FIGS. 6 and 7 in which a fourth embodiment is shown a shielding case is composed of a recording head section and a reproducing head section which are formed integral with each other. The shielding case 1 can be divided along a recording gap plane and a reproducing gap plane to form left and right shielding case segments 11, 12 and a central shielding case segment 13. In the central shielding case segment 13 there is formed a partition 13a for dividing it into right and left portions.

This shielding case is prepared by forming first and second pairs of shielding case halves, joining the shielding case halves of the first pair back to back to form central shielding case segment 13 and joining the shielding case halves of the second pair, as left and right shielding case segments 11 and 12, to the central shielding case segment 13.

In each of the shielding case segments 11, 12 and 13, there are, in advance, mounted cores 2, 3 and a shielding plate 5 together with a core holder 4 to form three units. The formation of those units by incorporating the cores 2, 3 and the shielding plate 5 into each of the shielding case segments 11, 12 and 13 may be done by any of the following methods.

As a first method, the cores 2, 3 and the shielding plate 5 are mounted within the core holder 4, which in turn is inserted and fixed into each of the shielding case segments 11, 12 and 13 to form three units.

As a second method, the core holder 4 is formed in advance integrally within each of the shielding case segment 11, 12 and 13 by means of molding, then the cores 2, 3 and the shielding plate 5 are fixed into the core holder 4 to form three units. As a further method, the cores 2, 3 and the shielding plate 5 are positioned relative to each of the shielding case segments 11, 12 and 13, and in this state a molten synthetic resin or a molten die-casting zinc is poured over one portion of the cores while maintaining another portion above the molten material to integrate the components thereby forming three units. In this case, if coils are wound around the cores 2 and 3 in advance, they may be broken because of the pouring of a high temperature resin or metal, and therefore the coils are fitted over junction portions of the cores 2 and 3 which has remained above the poured material. Thereafter the three units are joined.

The junction surfaces of the so-formed units are polished to form mirror surfaces and overlapped together through a gap spacer not shown, then the shielding cases 11 and 13 and the shielding cases 12 and 13 are joined by arc welding, brazing or laser welding to form a combination head.

This embodiment particularly improves the accuracy of parallelism between both recording and reproducing gaps, the track position, etc., and it is possible to form gaps quickly and easily.

In any of the above embodiments, it is not always necessary that the welding covers completely the junction surfaces. The welding may be effected only at important points (spot welds). Then, the core ends outside the shielding case is polished to define a tape sliding surface and a magnetic head is completed. Behind the core holder 4 there is provided a terminal strip thought not shown in the drawing.

According to the present invention, a magnetic head is produced from prefabricated units each composed of a shielding case half, cores, and core holders. In the assembly of each unit, the cores are easily and accurately positioned relative to the case half. As a result, the manufacture of magnetic heads has become easy and inexpensive while ensuring high accuracy of the products.

What is claimed is:

1. A magnetic head composed of at least two units, each unit comprising
    a shielding case half having a notched window formed therein;
    support means provided within said shielding case half; and
    at least one core supported by said support means within the shielding case half, one end portion of said core defining a gap surface, said gap surface extending outside of said shielding case half through said notched window, wherein at least two of said units are joined to each other such that said gap surface of one unit faces the gap surface of the core of an adjacent unit.

2. A magnetic head according to claim 1, wherein said at least two units comprises two units joined face to face with each other to form a single head.

3. A magnetic head according to claim 1, wherein said at least two units comprises two units joined back to back with each other and two further units, each of said further units being joined to one of said joined two units wherein a combination head is formed having a recording head section and a reproducing head section.

4. A magnetic head according to any of claims 1 to 3, wherein said support means includes a core holder fixed within the shielding case half.

5. A magnetic head according to any one of claims 1 to 3, wherein said support means includes a core holder molded integrally with the shielding case half therewithin.

6. A magnetic head according to any one of claims 1 to 3, wherein said support means includes a non-magnetic material selected from the group consisting of a synthetic resin and a diecasting zinc.

7. A magnetic head according to claim 1, wherein a spacer is provided between said facing gap surface of the cores.

* * * * *